US011498848B2

(12) United States Patent
Méli et al.

(10) Patent No.: US 11,498,848 B2
(45) Date of Patent: Nov. 15, 2022

(54) PRECIPITATED CALCIUM CARBONATE FOR REDUCING EMISSIONS OF VOLATILE ORGANIC COMPOUNDS

(71) Applicant: IMERTECH SAS, Paris (FR)

(72) Inventors: Gilles Méli, Le Fauga (FR); Anaïs Berjeaud, Toulouse (FR); Alexandra Jakob, Arles (FR)

(73) Assignee: IMERYS MINERALS LIMITED ( * ) Notice: Subject to any disclaimer, the term of this patent is extended or adjusted under 35 U.S.C. 154(b) by 319 days.

(21) Appl. No.: 16/604,787

(22) PCT Filed: Apr. 12, 2018

(86) PCT No.: PCT/EP2018/059479
§ 371 (c)(1),
(2) Date: Oct. 11, 2019

(87) PCT Pub. No.: WO2018/189346
PCT Pub. Date: Oct. 18, 2018

(65) Prior Publication Data
US 2021/0300777 A1 Sep. 30, 2021

(30) Foreign Application Priority Data
Apr. 13, 2017 (EP) ..................... 17305440

(51) Int. Cl.
C09C 1/02 (2006.01)
C01F 11/06 (2006.01)
C08K 3/26 (2006.01)
C08K 7/24 (2006.01)
B82Y 30/00 (2011.01)
B82Y 40/00 (2011.01)
F01N 3/08 (2006.01)

(52) U.S. Cl.
CPC ............... C01F 11/06 (2013.01); C08K 3/26 (2013.01); C08K 7/24 (2013.01); B82Y 30/00 (2013.01); B82Y 40/00 (2013.01); C01P 2004/17 (2013.01); C01P 2004/64 (2013.01); C01P 2006/12 (2013.01); C01P 2006/14 (2013.01); C01P 2006/16 (2013.01); C08K 2003/265 (2013.01); C08K 2201/005 (2013.01); C08K 2201/006 (2013.01); F01N 3/0828 (2013.01)

(58) Field of Classification Search
CPC ........... C09C 1/021; C04B 14/28; C08K 3/01; C08K 2201/00; C08K 2201/006
See application file for complete search history.

(56) References Cited

U.S. PATENT DOCUMENTS

| 5,292,495 | A | 3/1994 | Nakajima et al. | |
| 5,882,631 | A | 3/1999 | Suga et al. | |
| 2007/0134450 | A1* | 6/2007 | Campbell | B41M 5/506 428/32.34 |
| 2008/0168925 | A1 | 7/2008 | Sare et al. | |
| 2009/0017233 | A1* | 1/2009 | Kaessberger | B82Y 30/00 428/32.1 |
| 2011/0168057 | A1 | 7/2011 | Gittins et al. | |
| 2012/0196233 | A1 | 8/2012 | Ni et al. | |
| 2013/0145959 | A1 | 6/2013 | Di Emidio | |
| 2016/0016810 | A1* | 1/2016 | Rico | B82Y 30/00 106/31.13 |
| 2017/0129782 | A1* | 5/2017 | Buri | C04B 20/1051 |

FOREIGN PATENT DOCUMENTS

| CN | 1204506 A | 1/1999 |
| CN | 1515495 A | 7/2004 |
| CN | 103589072 A | 2/2014 |
| CN | 106398312 A | 2/2017 |
| JP | 11-310522 | 11/1999 |
| JP | 2004-105854 | 4/2004 |
| JP | 2006 022141 A | 1/2006 |
| JP | 2015-504398 | 2/2015 |
| WO | WO 2007/006796 A1 | 1/2007 |
| WO | WO 2014/178271 A1 | 11/2014 |
| WO | WO 2017/106070 A1 | 6/2017 |

OTHER PUBLICATIONS

EPA.GOV., Rule 102 Definitions, Volative Organic Compounds (VOC), Amendments Aug. 29, 2012 (Year: 2012).*
Machine Translation JP 08-198623 (Year: 1996).*
International Search Report and Written Opinion dated Jun. 25, 2018, in International Application No. PCT/EP2018/059479 (20 pgs.).
Search Report for International Application No. 201880028092.0 (3 pages).

* cited by examiner

Primary Examiner — Hoa (Holly) Le
(74) Attorney, Agent, or Firm — Finnegan, Henderson, Farabow, Garrett & Dunner LLP

(57) ABSTRACT

Use of a porous precipitated calcium carbonate (PCC) to retain volatile organic compounds (VOCs), a method of reducing emission of VOCs from a composition, the method comprising adding a porous PCC to the composition, said compositions such as polymer compositions and methods of making said compositions.

15 Claims, No Drawings

ID CALCIUM CARBONATE
PRECIPITATED CALCIUM CARBONATE FOR REDUCING EMISSIONS OF VOLATILE ORGANIC COMPOUNDS

CLAIM FOR PRIORITY

This application is a U.S. national phase entry under 35 U.S.C. § 371 from PCT International Application No. PCT/EP2018/059479, filed Apr. 12, 2018, which claims the benefit of priority of EP Application No. 17305440.4, filed Apr. 13, 2017, from which this application claims priority and all of whcih are incorporated herein by reference.

TECHNICAL FIELD

The present invention relates generally to the use of porous precipitated calcium carbonate (PCC) to retain volatile organic compounds (VOCs). This may, for example, occur by absorption and/or adsorption. In particular, the present invention relates to the use of porous PCC to reduce emission of VOCs from a composition. The present invention further relates to compositions comprising porous PCC and methods of making said compositions.

BACKGROUND

Volatile organic compounds (VOCs) are organic compounds that have high vapour pressure at room temperature, causing large numbers of molecules to evaporate or sublimate from the liquid or solid and enter the surrounding air. There is a wide variety of VOCs, including both man-made and naturally-occurring compounds, some of which may be dangerous to animal health or may harm the environment. In particular, paints, adhesives, coatings and polymer compositions suitable for use in the automotive industry often contain relatively high levels of VOCs. The emission of man-made VOCs is therefore often regulated, especially indoors. It is therefore desirable to provide alternative and/or improved methods and products to reduce the concentration of VOCs in the atmosphere.

SUMMARY

In accordance with a first aspect of the present invention there is provided the use of porous PCC to retain VOCs. In accordance with a further aspect of the present invention there is provided the use of porous PCC to adsorb and/or absorb VOCs. In accordance with a further aspect of the present invention there is provided the use of porous PCC to retain VOCs in a composition such as a polymer composition. In accordance with a further aspect of the present invention there is provided the use of a porous PCC to adsorb and/or absorb VOCs in a composition such as a polymer composition. This may, for example, reduce emission of VOCs from the composition (e.g. polymer composition). In accordance with a further aspect of the present invention there is provided the use of porous PCC to reduce the concentration of VOCs in the atmosphere.

In accordance with a second aspect of the present invention there is provided a method of reducing emission of VOCs from a composition, the method comprising adding porous PCC to the composition.

In accordance with a third aspect of the present invention there is provided a composition comprising porous PCC. The composition may, for example, be a polymer composition.

In accordance with a fourth aspect of the present invention there is provided a method of making a polymer composition comprising porous PCC, the method comprising mixing the polymer resin and porous PCC and optionally curing the polymer resin.

In certain embodiments, the porous PCC comprises nanofibers and/or nanochain like agglomerates.

In certain embodiments, the nanofibers and/or nanochain like agglomerates comprise a plurality of interlinked calcite crystals.

In certain embodiments, the calcite crystals have rhombohedral morphology.

In certain embodiments, the nanofibers and/or nanochain like agglomerates are aggregated to form microshells.

Certain embodiments of any aspect of the present invention may provide one of more of the following advantages:
 adsorption of VOCs (e.g. from a composition or from the atmosphere);
 reduced emission of VOCs from a composition (e.g. compared to a composition not comprising porous PCC and/or compared to a composition comprising an alternative product for reducing VOCs emission);
 reduced concentration of VOCs in the atmosphere.

The details, examples and preferences provided in relation to any particulate one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The present invention is based on the surprising finding that porous precipitated calcium carbonate (PCC) is able to reduce emission of volatile organic compounds (VOCs) from polymer compositions. Without wishing to be bound by theory, it is thought that the VOCs are retained by the porous PCC. By "retain", it is meant that the VOCs are prevented from moving freely in the atmosphere surrounding the porous PCC. For example, the VOCs may be prevented from being released into the atmosphere surrounding the porous PCC. This may, for example, occur by mechanical entrapment. The VOCs may, for example, be retained by absorption and/or adsorption by the porous PCC.

The term "volatile organic compounds (VOCs)" is well understood in the art and refers to organic compounds that have high vapour pressure at room temperature, causing large numbers of molecules to evaporate or sublimate from the liquid or solid and enter the surrounding air. In certain embodiments, the term refers to organic compounds having an initial boiling point less than or equal to 250° C. at standard atmospheric pressure. In certain embodiments, the term refers to organic compounds that have boiling points in the range of 50° C. to 250° C. at standard atmospheric pressure.

The present invention therefore provides a use of porous PCC to retain VOCs. For example, the present invention provides a use of porous PCC to absorb and/or adsorb VOCs. A use of porous PCC to reduce the concentration of VOCs in the atmosphere is also provided.

In certain embodiments, the VOCs may be present in the atmosphere. For example, the VOCs may be present in the atmosphere from the combustion of fossil fuels, tobacco smoke, exhaust fumes from vehicles, paints, coatings, adhesives or polymer compositions. In certain embodiments, the porous PCC may be used in an air purification system, for example where air comprises reduced VOCs after filtration through the porous PCC.

In certain embodiments, the VOCs may be present in a composition (e.g. a polymer composition) and/or generated during processing of the composition, and the porous PCC is used to retain VOCs in the composition and thus reduce emission of VOCs from the composition. Processing the composition includes, for example, manufacturing the composition (e.g. during curing of a polymer composition), forming a product from the composition or during the life cycle of the product (e.g. during installation the product). The present invention thus also provides a method of reducing emission of VOCs from a composition, the method comprising adding porous PCC to the composition.

The porous PCC may, for example, reduce the concentration of VOCs in a specified volume of air by at least about 10%. For example, the porous PCC may reduce the concentration of VOCs in a specified volume of air by at least about 15% or by at least about 20% or by at least about 25% or by at least about 30% or by at least about 35% or by at least about 40%. For example, the porous PCC may reduce the concentration of VOCs in a specified volume of air by up to about 100%, for example up to about 95% or up to about 90% or up to about 85% or up to about 80% or up to about 75% or up to about 70% or up to about 65% or up to about 60%. Concentration of VOCs in a specified volume of air may, for example, be measured using a VOC sensor, for example by thermal desorption (e.g. TD-GC/MS).

The porous PCC may, for example, reduce VOCs emission from a composition (e.g. polymer composition) by at least about 10% compared to a comparative composition that is identical except that it does not comprise porous PCC. The comparative composition may, for example, comprise another type of PCC, ground calcium carbonate (GCC) or mineral in place of the porous PCC. Alternatively, the comparative composition may comprise an additional amount of polymer in place of the porous PCC. The porous PCC may, for example, reduce VOCs emission from a composition (e.g. polymer composition) by at least about 15% or by at least about 20% or by at least about 25% or by at least about 30% or by at least about 35% compared to a comparative composition that is identical except that it does not comprise porous PCC. The comparative composition may, for example, reduce VOCs emission from a composition (e.g. polymer composition) by up to about 100% or by up to about 95% or by up to about 90% or by up to about 85% or by up to about 80% or by up to about 75% or by up to about 70% or by up to about 65% or by up to about 60% in comparison to a comparative composition that is identical except that it does not comprise porous PCC. VOCs emission may, for example, be measured using a VOC sensor, for example by thermal desorption (e.g. TD-GC/MS).

The composition may, for example, be a polymer composition. The composition may, for example, be a paint, coating (e.g. varnish) or adhesive composition.

The polymer may, for example, be a thermoplastic polymer. The polymer may, for example, be an elastomeric polymer. The polymer may, for example, be present in the form of a polymer matrix. The other components of the polymer composition (e.g. porous PCC) are dispersed in the polymer matrix.

The polymer may, for example, be polyalkylene (e.g. polyethylene, polypropylene or polybutylene), polyoxymethylene (also known as polyacetal and polyformaldehyde), polyvinyl ester (general formula —[RCOOCHCH$_2$]—), an acrylic polymer, an epoxy polymer, polystyrene, polyvinyl chloride, polyvinyl acetate, polyvinyl alcohol, polyacrylonitrile, acrylonitrile butadiene styrene, polyamide, polylactic acid, polybenzimidazole, polybenzoxazole, polybenzthiazole, polycarbonate, polyether sulfone, polyetherether ketone, polyimide, polyetherimide, polyphenylene sulfide, polytetrafluoroethylene, polyvinyl acetate (e.g. ethylene vinyl acetate or poly(meth methacrylate)), or a combination of two or more thereof.

The polymer may, for example, be a synthetic rubber (any artificial elastomer). For example, the polymer may be a polymer comprising one or more of isoprene, chloroprene and isobutylene. For example, the polymer may be styrene-butadiene rubber (SBR), polyacrylate rubber, ethylene vinyl acetate copolymer, polyvinyl chloride, ethylene acrylate rubber, polyester urethane, bromo isobutylene isoprene, polybutadiene, chloro isobutylene isoprene, polychloroprene, chlorosulphonated polyethylene, epichlorohydrin, ethylene propylene, ethylene propylene diene monomer rubber (EPDM), polyether urethane, perflurocarbon rubber, fluorinated hydrocarbon, fluoro silicone, fluorocarbon rubber, hydrogenated nitrile butadiene, polyisoprepne, isobutylene isoprene butyl, acrylonitrile butadiene, polyurethane, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, styrene butadiene carboxy block copolymer or a combination of one or more thereof. In certain embodiments, the polymer is EPDM, ethylene vinyl acetate copolymer, polyvinyl chloride or a combination of one or more thereof.

The porous PCC may be used in the composition (e.g. polymer composition) in an amount ranging from about 0.1 wt % to about 20 wt %. For example, the porous PCC may be used in the composition (e.g. polymer composition) in an amount ranging from about 0.5 wt % to about 18 wt % or from about 1 wt % to about 17 wt % or from about 1.5 wt % to about 16 wt % or from about 2 wt % to about 15 wt %. For example, the porous PCC may be used in the composition in an amount ranging from about 0.1 wt % to about 20 wt % or from about 0.1 wt % to about 18 wt % or from about 1 wt % to about 16 wt % or from about 0.1 wt % to about 15 wt % or from about 0.1 wt % to about 14 wt % or from about 0.1 wt % to about 12 wt % or from about 0.1 wt % to about 10 wt % or from about 0.1 wt % to about 8 wt % or from about 0.1 wt % to about 6 wt % or from about 0.1 wt % to about 5 wt % or from about 0.1 wt % to about 4 wt % or from about 0.1 wt % to about 3 wt % or from about 0.1 wt % to about 2 wt %.

The term "porous" used in relation to PCC refers to the presence of voids that allow gases and/or liquids to pass through the PCC. In particular, the term "porous" refers to the presence of voids in between the elementary particles of PCC that are interlinked to form PCC aggregates.

The porous PCC may, for example, have a total pore volume equal to or greater than about 0.04 cm$^3$/g. The porous PCC may, for example, have a total pore volume equal to or greater than about 0.045 cm$^3$/g or equal to or greater than about 0.05 cm$^3$/g or equal to or greater than about 0.055 cm$^3$/g or equal to or greater than about 0.06 cm$^3$/g or equal to or greater than about 0.065 cm$^3$/g or equal to or greater than about 0.07 cm$^3$/g or equal to or greater than about 0.075 cm$^3$/g or equal to or greater than about 0.08 cm$^3$/g or equal to or greater than about 0.085 cm$^3$/g or equal to or greater than about 0.09 cm$^3$/g or equal to or greater than about 0.095 cm$^3$/g or equal to or greater than about 0.1 cm$^3$/g.

The porous PCC may, for example, have a total pore volume equal to or less than about 0.4 cm³/g. For example, the porous PCC may have a total pore volume equal to or less than about 0.35 cm³/g or equal to or less than about 0.3 cm³/g or equal to or less than about 0.25 cm³/g or equal to or less than about 0.2 cm³/g.

The porous PCC may, for example, have a total pore volume ranging from about 0.04 cm³/g to about 0.4 cm³/g or from about 0.045 cm³/g to about 0.35 cm³/g or from about 0.05 cm³/g to about 0.3 cm³/g or from about 0.1 cm³/g to about 0.2 cm³/g.

The porous PCC may, for example, have an average pore size equal to or greater than about 2 nm. For example, the porous PCC may have an average pore size equal to or greater than about 3 nm or equal to or greater than about 4 nm or equal to or greater than about 5 nm or equal to or greater than about 6 nm or equal to or greater than about 7 nm or equal to or greater than about 8 nm or equal to or greater than about 9 nm or equal to or greater than about 10 nm or equal to or greater than about 11 nm.

The porous PCC may, for example, have an average pore size equal to or greater than about 12 nm. For example, the porous PCC may have an average pore size equal to or greater than about 12.5 nm or equal to or greater than about 13 nm or equal to or greater than about 13.5 nm or equal to or greater than about 14 nm or equal to or greater than about 14.5 nm or equal to or greater than about 15 nm or equal to or greater than about 15.5 nm or equal to or greater than about 16 nm.

The porous PCC may, for example, have an average pore size equal to or less than about 50 nm. For example, the porous PCC may have an average pore size equal to or less than about 48 nm or equal to or less than about 46 nm or equal to or less than about 45 nm or equal to or less than about 44 nm or equal to or less than about 42 nm or equal to or less than about 40 nm or equal to or less than about 38 nm or equal to or less than about 36 nm or equal to or less than about 35 nm or equal to or less than about 34 nm or equal to or less than about 32 nm or equal to or less than about 30 nm or equal to or less than about 28 nm or equal to or less than about 26 nm or equal to or less than about 25 nm or equal to or less than about 24 nm or equal to or less than about 22 nm.

The porous PCC may, for example, have an average pore size equal to or less than about 20 nm. For example, the porous PCC may have an average pore size equal to or less than about 19.5 nm or equal to or less than about 19 nm or equal to or less than about 18.5 nm or equal to or less than about 18 nm or equal to or less than about 17.5 nm or equal to or less than about 17 nm.

The porous PCC may, for example, have an average pore size ranging from about 2 nm to about 50 nm or from about 5 nm to about 40 nm or from about 10 nm to about 30 nm. For example, the porous PCC may have an average pore size ranging from about 12 nm to about 20 nm or from about 14 nm to about 18 nm or from about 15 nm to about 17 nm.

Pore size properties (e.g. total pore volume and average pore size) are measured using the cylindrical shape assumption (4V/A), which is part of the BJH (Barrett-Joyner-Halenda) model. The BJH model is derived from the same $N_2$ absorption isotherm that is used for BET surface area calculation (measurement according to the BET method, AFNOR standard X11-621 and 622 or ISO 9277). The BJH model is described in Barrett et al., Am. Chem. Soc., 73 (1951), pages 373 to 380, the contents of which are incorporated herein by reference. A Micromeritics TRISTAR 3000 and Micromeritics VACPREP 061 may, for example, be used. The samples may, for example, be degassed in an oven overnight at 105° C., followed by 180° C. for 30 minutes under nitrogen flow and cooling for 30 minutes under nitrogen flow. The isotherm may, for example, be measured for relative pressures $P/P_0$ ranging from 0.05 to 0.98. Average pore size refers to pore diameter. Porous volume is cumulative and obtained by BJH on the desorption branch for pore sizes between 1.7 and 50 nm.

The term "precipitated calcium carbonate (PCC)" refers to synthetic calcium carbonate, which may be made by any method known in the art.

TAPPI Monograph Series No 30, "Paper Coating Pigments", pages 34-35, the contents of which are incorporated herein by reference, describes the three main commercial processes for preparing precipitated calcium carbonate. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide should be substantially completely separated from the calcium carbonate if this process is to be commercially attractive. In the third main commercial process, the milk of lime is first contacted with ammonium chloride to give a calcium chloride solution and ammonia gas. The calcium chloride solution is then contacted with soda ash to produce, by double decomposition, precipitated calcium carbonate and a solution of sodium chloride.

Alternatively, PCC may be made by reacting gypsum (calcium sulphate) with ammonium carbonate or ammonium bicarbonate.

Alternatively, PCC may be made by reacting calcium chloride with sodium carbonate or ammonium carbonate.

In certain embodiments, the porous PCC is obtained by and/or is obtainable by carbonation of milk of lime in the presence of a crystallization controller selected from polyacrylic acid, salts thereof and mixtures thereof. For instance, the PCC may be prepared by one or more of the methods described in WO03/004414, the contents of which are incorporated herein by reference, particularly page 2, line 11 to page 3, line 38; page 4, line 29 to page 5, line 6; and page 5, line 36 to page 6, line 28 as well as examples 4 and 5.

In the preparation process, the concentration of calcium hydroxide in the milk of lime can have a value of 0.3 to 30% by weight of the milk of lime. Advantageously, this concentration has a value of at least 1 wt %, especially equal to or higher than 2 wt %, for instance equal to or higher than 2.5 wt %. It is recommended that the concentration of calcium hydroxide in the milk of lime does not exceed 25 wt %, in particular equal to or lower than 20 wt %, values equal to or lower than 15 wt % being especially suitable. For instance, the concentration of calcium hydroxide in the milk of lime might be in a low range such as from 2 to 5 wt %, or in higher range such as from 10 to 15 wt %.

In said preparation process, the temperature may vary from 0 to 80° C., especially from 10 to 60° C. Usually, the temperature at the beginning of carbonation is equal to or higher than 10° C., in particular equal to or higher than 12° C. The temperature at the beginning of carbonation is often equal to or lower than 25° C., most often equal to or lower than 20° C. Temperature at the beginning of carbonation might for instance be around 15° C. Temperature at the end of carbonation might be higher, typically from 10 to 80° C., for instance from 15 to 60° C.

In the preparation process, milk of lime is carbonated by reaction of the latter with carbon dioxide gas. Carbon dioxide gas having a concentration of carbon dioxide varying from 3 to 100% could be used with success. However, it is preferable to use carbon dioxide gas for which the concentration is from 10 to 60%, especially from 25 to 40%, carbon dioxide gas being diluted with air.

Some additives might also be further added during the carbonation step, such as isoascorbic acid, to reduce yellowness of the resulting calcium carbonate particles. Said preparation process typically leads to a precipitated calcium carbonate slurry comprising for instance 3 to 20 wt % PCC by weight of slurry.

The precipitated calcium carbonate particles might then be filtered, for example through a planar filter, and dried, for instance in an oven, by spraying into a stream of hot air (spray drying), or by the action of radiation such as infrared radiation (epiradiator), preferably in an oven or by the action of radiation such as infrared radiation. The resulting particles might then be further milled, for instance in a pin mill apparatus with a milling intensity ranging from 10 000 rpm to 20 000 rpm.

The process for making PCC results in very pure calcium carbonate crystals, which may be referred to as "elementary" or "primary" particles. In this context, the term "elementary particle" or "primary particle" refers to a physically and chemically autonomous entity. The elementary particles may be a variety of different shapes and sizes, depending on the specific reaction process that is used. Mixtures of different morphologies may also be used.

The main forms of PCC crystals are aragonite and calcite. Aragonite crystals are needle-shaped and may be randomly aggregated. Calcite crystals may be pseudo-spherical, cubic or scalenohedral morphology. For example, calcite crystals may have rhombohedral morphology. The present invention may tend to be discussed in terms of calcite crystals, particularly rhombohedral calcite crystals. However, the invention should not be construed as being limited to such embodiments.

The primary particles may, for example, have an average particle size (dp) ranging from about 10 nm to about 500 nm. For example, the primary particles may have an average particle size (dp) ranging from about 20 nm to about 450 nm or from about 20 nm to about 400 nm or from about 20 nm to about 350 nm or from about 20 nm to about 300 nm or from about 20 nm to about 250 nm or from about 20 nm to about 200 nm or from about 20 nm to about 150 nm or from about 20 nm to about 100 nm. For example, the primary particles may have an average particle size (dp) ranging from about 20 nm to about 100 nm or from about 25 nm to about 95 nm or from about 30 nm to about 90 nm or from about 35 nm to about 85 nm. For example, the primary particles may have an average particle size (dp) ranging from about 20 nm to about 80 nm or from about 20 nm to about 75 nm or from about 20 nm to about 70 nm or from about 25 nm to about 65 nm or from about 25 nm to about 60 nm. These values relate to the primary particles before any optional coating is added.

The average primary particle size (dp) is typically measured by permeability, which is described below:

dp is determined by permeability measured according to a method derived from BS 4359-2. The basis of this method is the measurement of the air permeability of a pellet, which is analogous to the "Blaine" or the "Lea & Nurse method". The calculation of the dp derives from the Carman & Malherbe formula:

$$q \times L = \frac{1.05\varepsilon^2}{(1-\varepsilon)^2}ds^2 + \frac{2.88\varepsilon^2}{1-\varepsilon}ds \text{ with}$$

$$\varepsilon = 1 - \frac{W}{A \times L \times D}$$

It can be shown that the mean particle diameter ds which is determined according to the Carman & Malherbe formula is not absolutely independent from the porosity of the pellet. Consequently, a correction was brought considering the reference porosity $\varepsilon=0.45$ and the dp was calculated according to the formula:

$$dp = ds \times e^{-3.2(\varepsilon-0.45)}$$

Definitions and unities are as follows:
q=volumetric rate of air flow passed through the PCC pellet ($cm^3/g$),
$\varepsilon$=porosity,
W=weight of PCC,
L=thickness of the pellet,
D=density of PCC ($g/cm^3$),
A=area of the cross section of the pellet ($cm^2$),
ds=mean particle diameter according to Carman & Malherbe ($\mu m$), and
dp=mean particle diameter ($\mu m$).

Rhombohedral crystals may, for example, form elongated entities (e.g. nanofibers and/or nanochain like agglomerates). Scalenohedral crystals are elongated entities per se. The porous PCC may, for example, have an elongated shape (i.e. an aspect ratio greater than 1). The elongated entities may, for example, have an aspect ratio equal to or greater than about 2 or equal to or greater than about 3 or equal to or greater than about 4 or equal to or greater than about 5. The elongated entities may, for example, have an aspect ratio equal to or less than about 50 or equal to or less than about 40 or equal to or less than about 20 or equal to or less than about 15 or equal to or less than about 10. Aspect ratio refers to the ratio of a "higher dimension" (L) of a particle, typically its length over a "smaller dimension" of the particle, usually its diameter. Aspect ratio may be determined by image analysis using SEM or TEM and working out the arithmetic mean aspect ratio.

The porous PCC may, for example, at least partially comprise elongated entities. The porous PCC may, for example, comprise at least about 1% elongated entities based on the weight of the calcium carbonate particles. For example, the porous PCC may comprise at least about 8% or at least about 10% or at least about 15% elongated entities based on the weight of the calcium carbonate particles.

Scalenohedral crystals may, for example, have an average primary particle size ranging from about 80 nm to about 300 nm, for example from about 100 nm to about 200 nm. This refers to the smaller dimension of the particle.

The elongated entities (e.g. scalenohedral primary particles) may, for example, aggregate to form microshells.

The elementary particles of PCC may be aggregated in various ways to form a secondary structure. For example, the elementary particles of the PCC may be at least partially in the form of nanofibers or nanochain like agglomerates. For example, the porous PCC may comprise, consist essentially of or consist of nanofibers or nanochain like agglomerates. These can be described as constituted by at least two interconnected primary particles and therefore having an elongated morphology. For example, the elementary particles of the PCC may be at least partially in the form of individual primary particles and/or may be randomly aggregated.

Each nanofiber and/or nanochain like agglomerate may comprise from about 2 to about 20 primary particles. For example, each nanofiber and/or nanochain like agglomerate may comprise from about 2 to about 15 or from about 2 to about 10 or from about 2 to about 8 primary particles.

In the terms "nanofibers" and "nanochain like agglomerate", the prefix "nano" means that the nanofibers or nanochain like agglomerates have at least one characteristic dimension at the nanoscale, in particular a characteristic dimension which is, on average, less than 500 nm, for example less than 250 nm or less than 200 nm or less than 100 nm. In nanofibers or nanochain like agglomerates, said characteristic dimension is the average diameter (i.e. the width of the nanofiber that corresponds to dp).

The term "nanofiber" intends to denote an elongated entity having a characteristic dimension, i.e. average diameter, less than 500 nm, for example less than 250 nm or less than 200 nm or less than 100 nm. The term "nanochain like agglomerate" intends to denote an elongated entity having a characteristic dimension, i.e. average diameter, less than 500 nm, for example less than 250 nm or less than 200 nm or less than 100 nm. Nanofibers mainly differ from nanochain like agglomerates in that the individual primary particles cannot be distinguished anymore and form nanofibers which appear to be homogeneous and even, for example on electron microscopy photographs, whatever the magnification. In nanochain like agglomerates, the primary particles retain their individuality and remain visible, for example on electron microscopy. Nanochain like agglomerates can also be named "nanorosaries".

The average primary particle size (dp) forming the nanofibers and/or nanochain like agglomerates is generally close to the smaller dimension of the scalenohedron elementary particles and to the average diameter of the nanofibers and/or nanochain like agglomerates. The average primary particle size (dp) may, for example, differ from the smaller dimension of the scalenohedral particle and/or from the average diameter of the nanofibers and/or nanochain like agglomerates by less than 50% or less than 25% or less than 10%.

The term "at least partially present in the form of nanofibers or nanochain like agglomerates" denotes that the precipitated calcium carbonate particles are generally present in the form of nanofibers or nanochain like agglomerates in an amount of at least 1% by weight of the calcium carbonate particles. Often, precipitated calcium carbonate particles are present in the form of nanofibers or nanochain like agglomerates in an amount of at least 8% by weight of the calcium carbonate particles. For example, precipitated calcium carbonate particles may be present in the form of nanofibers or nanochain like agglomerates in an amount of at least 10% by weight of the calcium carbonate particles or at least about 11% or at least about 12% or at least about 13% or at least about 14% or at least about 15% by weight of the calcium carbonate. For example, the precipitated calcium carbonate particles may be present in the form of nanofibers or nanochain like agglomerates in an amount up to about 100% or up to about 99% or up to about 98% or up to about 95% or up to about 90% or up to about 85% or up to about 80% or up to about 75% by weight of the calcium carbonate particles. The remaining precipitated calcium carbonate particles that are not in the form of nanofibers or nanochain like agglomerates may, for example, be present in the form of individual primary particles or aggregates (e.g. random aggregates) of individual primary particles.

The amount of nanofibers or nanochain like agglomerates can be evaluated relying on SEM (Scanning Electron Microscopy) or TEM (Transmission Electron Microscopy) image analysis. The obtained values correspond to the number of elementary particles that belongs to the nanofibers in respect to the total number of elementary nanoparticles, the measurement being performed in areas of acceptable resolution. The average is thus the arithmetic mean. It is preferred to determine the amount in a homogenized sample. For the determination using SEM, the calcium carbonate particles are metallized: The samples are directly placed on a graphite tape, then metallized with platinum for 1 minute under a vacuum of $10^{-1}$ Pa with a beam intensity of 6 mA. A Hitachi S-4800 SEM was used for the measurements. This can also be used to determine the average diameter of the scalendohedral primary particles and/or the average diameter of the nanofibers and/or nanochain like agglomerates. The average length and diameter can be estimated by image analysis of pictures taken by SEM or TEM, measuring directly the length of particles or measuring the length of rectangles comprising the particles.

When measuring average diameters, length etc. using SEM or TEM, magnification should be chosen in a reasonable way, such that the particles would be reasonably defined and present in a sufficient number. In such conditions, the analysis of a reasonable number of pictures, for instance around 10 pictures, should allow accurate characterization of the particles. If magnification is too low, the number of particles would be too high and the resolution too low. If magnification is too high, with for instance less than 10 particles per picture, the number of pictures to be analysed would be too high and several hundreds of pictures should be analysed to give accurate measurements. The method must therefore be chosen to provide a good dispersion degree of the nanoparticles in the sample. A magnification of 50k when using SEM may, for example, be appropriate.

The nanofibers and/or nanochain like agglomerates may have an average length ranging from about 20 nm to about 2000 nm. For example, the nanofibers and/or nanochain like agglomerates may have an average length ranging from about 20 nm to about 1900 nm or from about 20 nm to about 1800 nm or from about 20 nm to about 1700 nm or from about 20 nm to about 1600 nm or from about 20 nm to about 1500 nm or from about 20 nm to about 1400 nm or from about 20 nm to about 1300 nm or from about 20 nm to about 1200 nm or from about 20 nm to about 1100 nm or from about 20 nm to about 1000 nm. For example, the nanofibers and/or nanochain like agglomerates may have an average length ranging from about 50 nm to about 1000 nm or from about 50 nm to about 900 nm or from about 50 nm to about 800 nm or from about 100 nm to about 700 nm or from about 100 nm to about 600 nm or from about 100 nm to about 500 nm or from about 150 nm to about 500 nm or from about 200 nm to about 500 nm. For example, the nanofibers and/or nanochain like agglomerates may have an average length ranging from about 100 nm to about 400 nm or from about 100 nm to about 300 nm or from about 150 nm to about 250 nm.

The secondary structure may, for example, be further aggregated in a variety of ways to form a tertiary structure.

For example, the nanofibers or nanochain like aggregates of the precipitated calcium carbonate may be further aggregated to form microshells or microsheaves. Microshells may be composed of tens to hundreds of nanofibers or nanochain like agglomerates. In such a case, the nanofibers or nanochain like agglomerates are usually visible at least on the inner part of the microshell like agglomerates. Microsheaves are also denoted as "faggots". The nanofibres or nanochains are aggregated parallel to one another, in a surprising organized fashion, in such a microsheave. Such a microsheave generally composed of several tens of similar nanofibres and/or nanochains. This number is preferably greater than 100. Microsheaves comprising more than 10,000 nanofibres and/or nanochains are exceptional. The microsheaves may, for example, have a diameter equal to or greater than about 50 nm, for example between about 100 nm and about 500 nm. The length of the microsheaves may, for example, be similar to the length of the nanofibers and/or nanochain like agglomerates. Generally, the length of the microsheave is greater than that of the fibres. For example, the microsheaves may have a length between about 500 nm and about 1500 nm. Alternatively, the nanofibers or nanochain like agglomerates may be aggregated in a random fashion. Hereinafter, the present invention may tend to be discussed in terms of microshells. However, the invention should not be construed as being limited to such embodiments.

In certain embodiments, the PCC is at least partially present in the form of microshells comprising, consisting essentially of or consisting of nanofibers or nanochain like agglomerates by weight of the calcium carbonate particles. In certain embodiments, at least about 1% of the PCC particles are in the form of microshells comprising, consisting essentially of or consisting of nanofibers or nanochain like agglomerates by weight of the calcium carbonate particles. For example, at least about 8% or at least about 10% or at least about 15% or at least about 20% or at least about 25% or at least about 30% or at least about 35% or at least about 40% or at least about 45% or at least about 50% of the PCC is present in the form of microshells comprising, consisting essentially of or consisting of nanofibers or nanochain like agglomerates by weight of the calcium carbonate particles. In certain embodiments, up to about 100% of the PCC particles are in the form of microshells comprising, consisting essentially of or consisting of nanofibers or nanochain like agglomerates by weight of the calcium carbonate particles. For example, up to about 99% or up to about 98% or up to about 95% or up to about 90% or up to about 85% or up to about 80% or up to about 75% or up to about 70% of the PCC particles are in the form of microshells comprising, consisting essentially of or consisting of nanofibers or nanochain like agglomerates by weight of the calcium carbonate particles.

The porous PCC may, for example, comprise microshells of nanofibers and/or nanochain like agglomerates, microshells of scalenohedral crystals, microshells of nanofibers and/or nanochain like agglomerates and scalenohedral crystals, or a combination of one or more thereof.

The porous PCC may, for example, comprise nanoplates. For example, the primary particles may take the shape of nanoplates. Each nanoplate may, for example, have a thickness equal to or greater than about 20 nm. For example, each nanoplate may independently have a thickness ranging from about 20 nm to about 50 nm. The nanoplates may, for example, have a diameter/thickness ratio equal to or greater than about 5. The diameter/thickness ratio may, for example, be equal to or less than about 100 or equal to or less than about 10.

The nanoplates may, for example, be superimposed to form "accordians of nanoplates". The length of the accordians may, for example, be equal to or greater than about 200 nm. For example, the length of the accordians may be equal to or less than about 1500 nm.

The porous PCC may, for example, have a $d_{50}$ (sedigraph) ranging from about 0.1 µm to about 10 µm. For example, the porous PCC may have a $d_{50}$ (sedigraph) ranging from about 0.1 µm to about 9 µm or from about 0.1 µm to about 8 µm or from about 0.1 µm to about 7 µm or from about 0.1 µm to about 6 µm or from about 0.1 µm to about 5 µm. For example, the porous PCC may have a $d_{50}$ (sedigraph) ranging from about 0.2 µm to about 5 µm or from about 0.2 µm to about 4.5 µm or from about 0.3 µm to about 4 µm or from about 0.5 µm to about 4 µm or from about 0.5 µm to about 3.5 µm or from about 0.5 µm to about 3 µm or from about 0.6 µm to about 2.5 µm or from about 0.6 µm to about 2 µm or from about 0.7 µm to about 1.5 µm or from about 1 µm to about 2 µm. For example, the porous PCC may have a $d_{50}$ (sedigraph) ranging from about 0.6 µm to about 4 µm.

The porous PCC may, for example, have a $d_{95}$ (sedigraph) ranging from about 0.5 µm to about 15 µm. For example, the porous PCC may have a $d_{95}$ (sedigraph) ranging from about 0.5 µm to about 14 µm or from about 0.5 µm to about 13 µm or from about 0.5 µm to about 12 µm or from about 0.5 µm to about 11 µm or from about 0.5 µm to about 10 µm or from about 0.5 µm to about 9 µm or from about 0.5 µm to about 8 µm. For example, the porous PCC may have a $d_{95}$ (sedigraph) ranging from about 1 µm to about 8 µm or from about 1 µm to about 7.5 µm or from about 1 µm to about 7 µm or from about 1 µm to about 6.5 µm or from about 1 to about 6 µm or from about 1.5 µm to about 5.5 µm or from about 2 µm to about 5 µm or from about 2.5 µm to about 4.5 µm or from about 3 µm to about 4 µm. For example, the porous PCC may have a $d_{95}$ (sedigraph) ranging from about 2.5 µm to about 5 µm.

The porous PCC may, for example, have a $d_{75}$ (sedigraph) ranging from about 0.2 µm to about 12 µm. For example, the porous PCC may have a d75 (sedigraph) ranging from about 0.2 µm to about 11 µm or from about 0.2 µm to about 10 µm or from about 0.2 µm to about 9 µm or from about 0.2 µm to about 8 µm or from about 0.2 µm to about 7 µm or from about 0.2 µm to about 6 µm. For example, the porous PCC may have a d75 (sedigraph) ranging from about 0.2 µm to about 5.5 µm or from about 0.3 µm to about 5 µm or from about 0.4 µm to about 4.5 µm or from about 0.5 µm to about 4 µm or from about 0.5 µm to about 3.5 µm or from about 0.6 µm to about 3 µm. For example, the porous PCC may have a d75 (sedigraph) ranging from about 0.7 µm to about 3 µm.

The porous PCC may, for example, have a $d_{25}$ (sedigraph) ranging from about 0.05 µm to about 5 µm. For example, the porous PCC may have a $d_{25}$ (sedigraph) ranging from about 0.05 µm to about 4.5 µm or from about 0.05 µm to about 4 µm or from about 0.05 µm to about 3.5 µm or from about 0.1 µm to about 3 µm or from about 0.1 µm to about 2.5 µm or from about 0.1 µm to about 2 µm or from about 0.2 µm to about 1.5 µm or from about 0.3 µm to about 1 µm.

The porous PCC may, for example, have a $d_{50}$ (sedigraph) ranging from about 0.1 µm to about 10 µm, a $d_{95}$ (sedigraph) ranging from about 0.5 µm to about 15 µm and a $d_{25}$ (sedigraph) ranging from about 0.05 µm to about 5 µm. The porous PCC may, for example, additionally have a $d_{75}$ (sedigraph) ranging from about 0.2 µm to about 12 µm.

The porous PCC may, for example, have a $d_{50}$ (sedigraph) ranging from about 0.1 µm to about 5 µm, a $d_{95}$ (sedigraph) ranging from about 1 µm to about 8 µm and a $d_{25}$ (sedigraph) ranging from about 0.1 µm to about 3 µm. The porous PCC may, for example, additionally have a $d_{75}$ (sedigraph) ranging from about 0.5 µm to about 6 µm.

The porous PCC may, for example, have a $d_{50}$ (sedigraph) ranging from about 0.6 μm to about 4 μm, a $d_{95}$ (sedigraph) ranging from about 1 μm to about 6 μm and a $d_{25}$ (sedigraph) ranging from about 0.1 μm to about 2 μm. The porous PCC may, for example, additionally have a $d_{75}$ (sedigraph) ranging from about 0.5 μm to about 5 μm.

The porous PCC may, for example, have a $d_{50}$ (sedigraph) ranging from about 1 μm to about 2 μm, a $d_{95}$ (sedigraph) ranging from about 3 μm to about 4.5 μm and a $d_{25}$ (sedigraph) ranging from about 0.3 μm to about 1.5 μm. The porous PCC may, for example, additionally have a $d_{75}$ (sedigraph) ranging from about 1.5 μm to about 3 μm.

The porous PCC may, for example, have a $d_{95}$ (laser) ranging from about 5 μm to about 10 μm. For example, the porous PCC may have a $d_{95}$ (laser) ranging from about 5.5 μm to about 9.5 μm or from about 6 μm to about 9 μm or from about 6.5 μm to about 8.5 μm or from about 7 μm to about 8 μm.

The porous PCC may, for example, have a $d_{75}$ (laser) ranging from about 2 μm to about 8 μm. For example, the porous PCC may have a $d_{75}$ (laser) ranging from about 2.5 μm to about 7.5 μm or from about 3 μm to about 7 μm or from about 3.5 μm to about 6.5 μm or from about 4 μm to about 6 μm or from about 4.5 μm to about 5.5 μm or from about 4 μm to about 5 μm.

The porous PCC may, for example, have a $d_{50}$ (laser) ranging from about 0.5 μm to about 6 μm. For example, the porous PCC may have a $d_{50}$ (laser) ranging from about 1 μm to about 5.5 μm or from about 1.5 μm to about 5 μm or from about 2 μm to about 4.5 μm or from about 2.5 μm to about 4 μm or from about 3 μm to about 3.5 μm.

The porous PCC may, for example, have a $d_{25}$ (laser) ranging from about 0.1 μm to about 4 μm. For example, the porous PCC may have a $d_{25}$ (laser) ranging from about 0.5 μm to about 3.5 μm or from about 0.5 μm to about 3 μm or from about 1 μm to about 2.5 μm or from about 1 μm to about 2 μm or from about 1.5 μm to about 2.5 μm.

The porous PCC may, for example, have a $d_{95}$ (laser) ranging from about 5 μm to about 10 μm, a $d_{50}$ (laser) ranging from about 0.5 μm to about 6 μm and a $d_{25}$ (laser) ranging from about 0.1 μm to about 4 μm. The porous PCC may, for example, also have a $d_{75}$ (laser) ranging from about 2 μm to about 8 μm.

The porous PCC may, for example, have a $d_{95}$ (laser) ranging from about 6.5 μm to about 8.5 μm, a $d_{50}$ (laser) ranging from about 2 μm to about 4 μm and a $d_{25}$ (laser) ranging from about 1 μm to about 3 μm. The porous PCC may, for example, also have a $d_{75}$ (laser) ranging from about 4 μm to about 6 μm.

The porous PCC may, for example, have a $d_{95}$ (laser) ranging from about 7 μm to about 8 μm, a $d_{50}$ (laser) ranging from about 2.5 μm to about 3.5 μm and a $d_{25}$ (laser) ranging from about 1.5 μm to about 2.5 μm. The porous PCC may, for example, also have a $d_{75}$ (laser) ranging from about 4 μm to about 5.5 μm.

The porous PCC may, for example, comprise less than about 5 wt % of aggregates having a size above 10 μm as measured by sedigraph and/or laser. For example, the porous PCC may comprise less than 4 wt % or less than 3 wt % or less than 2 wt % or less than 1 wt % of aggregates having a size above 10 μm as measured by sedigraph and/or laser.

The $d_{50}$, $d_{95}$, $d_{75}$ and $d_{25}$ of the porous PCC refers respectively to the $d_{50}$, $d_{95}$, $d_{75}$ and $d_{25}$ of the final (e.g. tertiary structure) PCC material and thus may refer to the size of the aggregates/agglomerates that are formed. For example, where the porous PCC consists entirely of microshells, the $d_{50}$, $d_{95}$, $d_{75}$, and $d_{25}$ refers to the size of the microshells.

Particle size properties referred to herein may be measured in a well-known manner by sedimentation of the particulate filler or material in a fully dispersed condition in an aqueous medium using a Sedigraph 5100 machine as supplied by Micromeritics Instruments Corporation, Norcross, Ga., USA (telephone: +17706623620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{98}$, $d_{90}$ and the $d_{10}$ are the values determined in this way of the particle e.s.d. at which there are 98%, 90% and 10% respectively by weight of the particles which have an equivalent spherical diameter less than that $d_{98}$, $d_{50}$ or $d_{10}$ value.

Particle size properties referred to herein may also be measured by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S (as supplied by Malvern instruments) provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by weight of the particles which have an equivalent spherical diameter less than that $d_{50}$ value. For the avoidance of doubt, the measurement of particle size using laser light scattering is not an equivalent method to the sedimentation method referred to above.

In certain embodiments, the porous PCC comprises microshells of nanofibers and/or nanochain like agglomerates, wherein the nanofibers and/or nanochain like agglomerates have an average length ranging from about 100 nm to about 500 nm, the primary particles have an average diameter (dp) ranging from about 20 nm to about 100 nm and the porous PCC has a $d_{50}$ ranging from about 0.1 μm to about 5 μm.

The porous PCC may, for example, have an aggregation ratio, defined as the ratio of the aggregate median size ($d_{50}$) on the average diameter (dp) of the primary particles, higher than 1. For example, the porous PCC may have an aggregation ratio equal to or greater than about 2 or equal to or greater than about 5 or equal to or greater than about 10 or equal to or greater than about 20. For example, the porous PCC may have an aggregation ratio equal to or less than about 300 or equal to or less than about 100 or equal to or less than about 50.

The PCC may optionally be surface-modified, for example by coating. The coating may consist of, consist essentially of, or comprise a silane or any salt thereof, for example an organic silane. The PCC may be coated with a fatty acid or salt thereof. For example, the calcium carbonate may be coated with stearic acid or a stearate. The level of coating may be about 0.1 to about 10 wt % based on the total weight of the coated PCC, for example between about 0.1 and about 3 wt %, for example between about 0.5 or 0.6 or 0.7 or 0.8 and about 2.0 wt % e.g. about 1.5 wt %. The term "coating" used herein is to be understood broadly, and is not limited, for example, to uniform coatings or to coatings which cover the entire surface area of a particle. Particles in which discrete regions of the surface are modified with a coating will be understood as being coated within the terms of certain embodiments of the present invention. In certain embodiments, the porous PCC is not surface-modified or coated.

The porous PCC (i.e. final PCC material) may, for example, have a BET surface area ranging from about 10 $m^2/g$ to about 200 $m^2/g$. For example, the porous PCC may have a BET surface area ranging from about 20 $m^2/g$ to about 190 $m^2/g$ or from about 20 $m^2/g$ to about 180 $m^2/g$ or from about 20 $m^2/g$ to about 170 $m^2/g$ or from about 20 $m^2/g$ to about 160 $m^2/g$ or from about 20 $m^2/g$ to about 150 $m^2/g$ or from about 20 $m^2/g$ to about 140 $m^2/g$ or from about 20 $m^2/g$ to about 130 $m^2/g$ or from about 20 $m^2/g$ to about 120 $m^2/g$ or from about 20 $m^2/g$ to about 110 $m^2/g$ or from about 20 $m^2/g$ to about 100 $m^2/g$. The porous PCC may, for example, have a BET surface area ranging from about 15 $m^2/g$ to about 95 $m^2/g$ or from about 20 $m^2/g$ to about 90 $m^2/g$ or from about 25 $m^2/g$ to about 85 $m^2/g$ or from about 30 $m^2/g$ to about 80 $m^2/g$. For example, the porous PCC may have a BET surface area ranging from about 10 $m^2/g$ to about 60 $m^2/g$ or from about 15 $m^2/g$ to about 55 $m^2/g$ or from about 20 $m^2/g$ to about 50 $m^2/g$ or from about 20 $m^2/g$ to about 45 $m^2/g$.

As used herein, "BET surface area" refers to the area of the surface of the particles of the particulate talc material with respect to unit mass, determined according to the BET method by the quantity of nitrogen adsorbed on the surface of said particles so as to form a monomolecular layer completely covering said surface (measurement according to the BET method, AFNOR standard X11-621 and 622 or ISO 9277). In certain embodiments, BET surface area is determined in accordance with ISO 9277 or any method equivalent thereto. The BET surface area relate to PCC aggregates prior to any optional coating.

The porous PCC may optionally further comprise one or more crystallization controller(s). The crystallization controller may, for example, be selected from the group consisting of polyacrylic acid, salts thereof and mixtures thereof, citric acid, sodium dioctylsulfosuccinate, polyaspartic acid and Ethylenediaminetetraacetic acid (EDTA). Polyacrylic acid, salts thereof and mixtures thereof, and Ethylenediaminetetraacetic acid (EDTA) are the most preferred crystallization controllers.

The crystallization controller may, for example, be present in the porous PCC in an amount equal to or greater than about 0.1 wt % (by weight of calcium carbonate). For example, the crystallization controller may be present in the porous PCC in an amount equal to or greater than about 0.2 wt % or equal to or greater than about 0.25 wt % or equal to or greater than about 0.5 wt %. For example, the crystallization controller may be present in the porous PCC in an amount equal to or less than about 4 wt % or equal to or less than about 3 wt % or equal to or less than about 2.5 wt % or equal to or less than about 2 wt % or equal to or less than about 1 wt %.

When polyacrylic acid, salts thereof and mixtures thereof are present in the precipitated calcium carbonate particles, generally the molecular weight of the polyacrylic acid or its salt, in particular sodium salt, is from about 500 and up to about 15,000 g/mol. The molecular weight may, for example, be equal to or larger than about 500 g/mol or equal to or larger than about 700 g/mol or equal to or larger than about 1000 g/mol. Generally the molecular weight is equal to or less than about 15,000 g/mol, or equal to or less than about 10,000 g/mol or equal to or less than about 5000 g/mol. For example, the molecular weights may be from about 1000 to about 3500 g/mol. If the polyacrylic acid is present as salt, such as the sodium salt, the degree of acid neutralization by its cation, in particular sodium, can be from 0 to 100%. For instance, around 70% of the acid groups may be neutralized. The crystallization controlled may thus have a pH ranging from about 5 to about 6. For instance around 100% of the acid groups may be neutralized and the crystallization controller may have a pH ranging from about 6.5 to about 10.

The porous PCC may, for example, have a loss on drying (LOD) equal to or less than about 15 g/kg at 105° C. For example, the porous PCC may have an LOD equal to or less than about 14 g/kg or equal to or less than about 13 g/kg or equal to or less than about 12 g/kg or equal to or less than about 11 g/kg or equal to or less than about 10 g/kg. For example, the porous PCC may have an LOD ranging from about 2 g/kg to about 15 g/kg. For example, the porous PCC may have an LOD ranging from about 3 g/kg to about 12 g/kg or from about 4 g/kg to about 10 g/kg or from about 5 g/kg to about 9 g/kg or from about 6 g/kg to about 8 g/kg.

The LOD is determined according to the following procedure:

Into a weighing bottle, which is pre-dried at 105° C., about 10 g of precipitated calcium carbonate particles are weighed to the nearest 0.1 mg and heated at about 105° C. for 3 hours. The bottles are cooled to approximately 22° C. in a desiccator, and weighed to the nearest 0.1 mg. Loss on drying is calculated as g/kg=1000*(M1−M2)/M1, wherein M1 is the mass of the particles before drying in g, and M2 the mass of the particles after drying in g. The result is given in g/kg with 1 decimal.

The compositions (e.g. polymer compositions) disclosed herein may, for example, comprise further additives. For example, the compositions may further comprise one or more of coupling agents (e.g. maleic anhydride grafted polyolefins), compatibilizers (e.g. maleic anhydride grafted polyolefins), opacifying agents, pigments, colorants, slip agents (for example Erucamide), antioxidants, anti-fog agents, anti-static agents, anti-block agents, moisture barrier additives, gas barrier additives, dispersants, hydrocarbon waxes, stabilizers, co-stabilizers, lubricants, agents to improve tenacity, agents to improve heat-and-form stability, agents to improve processing performance, process aids (for example Polybatch® AMF-705), mould release agents (e.g. fatty acids, zinc, calcium, magnesium, lithium salts of fatty acids, organic phosphate esters, stearic acid, zinc stearate, calcium stearate, magnesium stearate, lithium stearate, calcium oleate, zinc palmiate), antioxidants and plasticizers.

Each of the further additives may independently be present in the composition in an amount ranging from about 0% to about 2% based on the total weight of the composition. For example, each of the further additives may be present in the composition in an amount ranging from about 0% to about 1.5% or from about 0% to about 1% or from about 0% to about 0.5%. The composition may, for example, comprise no more than about 10 wt % or no more than about 5 wt % or no more than about 4 wt % or no more than about 3 wt % or no more than about 2 wt % of further additives based on the total weight of the composition.

There is further provided herein compositions (e.g. polymer compositions) comprising a porous PCC in accordance with any aspect or embodiment described herein. There is further provided herein compositions comprising, consisting essentially of or consisting of polymer and a porous PCC in accordance with any aspect or embodiment described herein. There is further provided herein articles made from or comprising a composition in accordance with any aspect or embodiment disclosed herein.

There is also provided herein methods of making a composition (e.g. polymer composition) in accordance with any aspect or embodiment described herein. The method may, for example, comprise mixing a polymer, a porous PCC and any optional additives, and optionally curing the mixture.

The polymer compositions described herein may, for example, be made by compounding the polymer with the porous PCC. Compounding per se is a technique which is well known to persons skilled in the art of polymer processing and manufacture and consists of preparing plastic formulations by mixing and/or blending polymers and optional additives in a molten state. It is understood in the art that compounding is distinct from blending or mixing processes conducted at temperatures below that at which the constituents become molten. Compounding may, for example, be used to form a masterbatch composition. Compounding may, for example, involve adding a masterbatch composition to a polymer to form a further polymer composition.

The polymer compositions described herein may, for example, be extruded. For example, compounding may be carried out using a screw, e.g. a twin screw, compounder, for example, a Baker Perkins 25 mm twin screw compounder. For example, compounding may be carried out using a multi roll mill, for example a two-roll mill. For example, compounding may be carried out using a co-kneader or internal mixer. The methods disclosed herein may, for example, include compression moulding or injection moulding. The polymer and/or PCC and/or optional additives may be premixed and fed from a single hopper.

The resulting melt may, for example, be cooled, for example in a water bath, and then pelletized. The resulting melt may be calendared to form a sheet or film.

The polymer compositions described herein may, for example, be shaped into a desired form or article. Shaping of the polymer compositions may, for example, involve heating the composition to soften it. The polymer compositions described herein may, for example, be shaped by molding (e.g. compression molding, injection molding, stretch blow molding, injection blow molding, overmolding), extrusion, casting, or themoforming.

The compositions disclosed herein may, for example, be substantially free of any VOC-reducing agents other than the porous PCC. The term "substantially free" may, for example, refer to equal to or less than about 2 wt % or equal to or less than about 1 wt % or equal to or less than about 0.5 wt % or equal to or less than about 0.1 wt % based on the total weight of the composition.

As used herein, the term "consisting essentially of" may, for example, exclude an additional element, step or ingredient not explicitly recited unless the additional element, step or ingredient does not materially affect the basic and novel properties of the invention. Where the one or more additional element(s), step(s) or ingredient(s) is/are one or more additional component(s) of a composition, the total amount of the additional component(s) in the composition may, for example, be limited to 10 wt %. For example, the total amount of the additional component(s) in the composition may be limited to 9 wt % or 8 wt % or 7 wt % or 6 wt % or 5 wt % or 4 wt % or 3 wt % or 2 wt % or 1 wt %.

The foregoing broadly describes certain embodiments of the present invention without limitation. Variations and modifications as will be readily apparent to those skilled in the art are intended to be within the scope of the present invention as defined in and by the appended claims.

Examples

The composition specified in Table 1 was prepared by dry-blending the components first before transferring the blend to a twin-roll mill at 155° C. during 5 minutes and cooling as quickly as possible by pressing between room-temperature metal plates. The composition was moulded at 170° C. and cooled down quickly again after moulding.

The composition specified in Table 2 was prepared by blending the components on a twin-roll mill between 65 and 70° C. during 20 minutes and the temperature was then decreased at 30° C. The composition was unloaded after downsizing the thickness to around 2.2 at 2.6 mm. The composition was moulded at 180° C.

GCC filler is a GCC having a BET surface area of 2 m$^2$/g, a d$_{50}$ (sedigraph) of 3 μm, 38 wt % (+/−5 wt %) of particles smaller than 2 μm and 15 wt % of particles larger than 10 μm.

The following minerals were tested for VOC reduction in the various formulations.

PCC 1 is a porous PCC having a BET surface area of about 32 m$^2$/g and a d$_{50}$ (sedigraph) of about 1.4 μm. PCC 1 has an average pore volume of about 0.05 cm$^3$/g and an average pore size of about 16.5 nm.

PCC 2 is a non-porous PCC having a BET surface area of about 19 m$^2$/g and a d$_{50}$ (laser) of about 0.5 μm. PCC 2 has a total pore volume of about 0.03 cm$^3$/g and an average pore size of about 11 nm.

PCC 3 is a non-porous PCC having a BET surface area of about 20 m$^2$/g and a d$_{50}$ (laser) of about 0.5 μm. PCC 3 has a total pore volume of about 0.04 cm$^3$/g and an average pore size of about 11 nm.

PCC 4 is a porous PCC having a BET surface area of about 44.5 m$^2$/g and a d$_{50}$ (laser) of about 3.35 μm. PCC 4 has an average pore volume of about 0.12 cm$^3$/g and an average pore size of about 15 nm.

DE 1 is a flux calcined diatomite having a BET surface area of 2 m$^2$/g, 90% of particles smaller than 25.0 μm (laser), 50% of particles smaller than 14.1 μm (laser) and 10% of particles smaller than 5.89 μm (laser).

DE 2 is a flux calcined, fresh water diatomite having a BET surface area of 1.5 m$^2$/g, 90% of particles smaller than 27.83 μm (laser), 50% of particles smaller than 15.76 μm (laser) and 10% of particles smaller than 6.60 μm (laser).

GCC 1 is a GCC having a BET surface area of 3 m$^2$/g, a d$_{50}$ (sedigraph) of 3.5 μm and 32 wt % of particles smaller than 2 μm.

Wollastonite 1 is a wollastonite having a BET surface area of 3.0 m$^2$/g, a d$_{50}$ (laser) of 4 μm and fineness of grind (Hegman) of 6.

TABLE 1

|  | Composition (phr) |
| --- | --- |
| PVC | 100 |
| Stabilizer (Stabiol CZ 3281/1) | 3 |
| Diisononyl phthalate (DINP) | 50 |
| GCC filler | 50 |
| VOC reducer | 4.06 |

TABLE 2

| | Composition (phr) |
|---|---|
| EPDM | 237 |
| Paraffinic oil | 5 |
| Stearic acid | 1.5 |
| Zinc oxide | 5 |
| TAC 70 tackifier | 2 |
| Luperox F40P (dicumyl peroxide on CaCO$_3$) | 9 |
| VOC reducer | 4.3 |

VOCs emission was analysed by introducing a sample in a degassing chamber under reconstituted air flow for thermodesorption at 80° C. during 2 hours. Emitted gases were stocked on a Tenax® TA support which was then analysed by TD/GCMS. VOCs emissions were compared to comparative compositions that were identical except that they did not comprise the VOC reducer.

In PVC, it was surprisingly found that PCC 1 reduced VOCs emissions by 33%, whereas PCC 2 had no impact and PCC 3 increased the level of emissions by 32%. DE 1 reduced VOCs emissions by 29% and DE 2 increased the level of emissions by 96%. PCC 4 reduced VOCs emissions by 70% compared to PCC 1.

In EPDM, it was surprisingly found that PCC 1 reduced VOCs emissions by 15%, whereas DE 2 reduced VOCs emissions by 10% and PCC 2, PCC 3 and GCC 1 had no effect on VOCs emissions.

The invention claimed is:

1. A method of reducing emissions of volatile organic compounds (VOCs) from a composition comprising a polymer, the method comprising adding porous precipitated calcium carbonate (PCC) to the composition, wherein
    the polymer is polyoxymethylene (POM), ethylene propylene diene monomer rubber (EPDM), ethylene vinyl acetate copolymer, polyvinyl chloride or a combination of one or more thereof; and
    the porous PCC has a total pore volume equal to or greater than about 0.04 cm$^3$/g, the total pore volume being cumulative and obtained by the Barrett-Joyner-Halenda (BJH) model on the desorption branch for pore sizes between 1.7 and 50 nm.

2. The method of claim 1, wherein the porous PCC has an average pore size equal to or greater than about 2 nm.

3. The method of claim 1, wherein the porous PCC has a BET surface area from about 10 m$^2$/g to about 200 m$^2$/g.

4. The method of claim 1, wherein the porous PCC has a d$_{50}$ (sedigraph) from about 0.1 µm to about 10 µm.

5. The method of claim 1, wherein the porous PCC comprises nanofibers and/or nanochain like agglomerates each consisting of a plurality of interlinked primary particles.

6. The method of claim 5, wherein the primary particles are calcite crystals.

7. The method of claim 5, wherein the nanofibers and/or nanochain like agglomerates are aggregated to form microshells.

8. The method of claim 5, wherein the primary particles have an average particle size (dp) from about 10 nm to about 500 nm.

9. The method of claim 5, wherein the nanofibers and/or nanochain like agglomerates have an average length from about 20 nm to about 2000 nm.

10. The method of claim 1, wherein the porous PCC comprises a crystallization controller.

11. The method of claim 1, wherein the VOCs emission from the composition is at least about 10% less than the VOCs emission from a comparative composition that is identical except that it does not comprise porous PCC.

12. The method of claim 1, wherein the porous PCC retains VOCs from the atmosphere, from fossil fuel fumes, or from cigarette fumes.

13. A polymer composition comprising a polymer and a porous precipitated calcium carbonate (PCC), wherein
    the polymer is polyoxymethylene (POM), ethylene propylene diene monomer rubber (EPDM), ethylene vinyl acetate copolymer, polyvinyl chloride or a combination of one or more thereof; and
    the porous PCC has a total pore volume equal to or greater than about 0.04 cm$^3$/g, the total pore volume being cumulative and obtained by the Barrett-Joyner-Halenda (BJH) model on the desorption branch for pore sizes between 1.7 and 50 nm.

14. The polymer composition of claim 13, wherein the porous PCC:
    has an average pore size equal to or greater than about 2 nm; and
    has a BET surface area from about 10 m$^2$/g to about 200 m$^2$/g.

15. A method of making a polymer composition comprising a polymer and a porous precipitated calcium carbonate (PCC), the method comprising mixing the porous PCC with the polymer and curing the mixture; wherein
    the polymer is polyoxymethylene (POM), ethylene propylene diene monomer rubber (EPDM), ethylene vinyl acetate copolymer, polyvinyl chloride or a combination of one or more thereof; and
    the porous PCC has a total pore volume equal to or greater than about 0.04 cm$^3$/g, the total pore volume bing cumulative and obtained by the Barrett-Joyner-Halenda (BJH) model on the desorption branch for pore sizes between 1.7 and 50 nm.

* * * * *

UNITED STATES PATENT AND TRADEMARK OFFICE
CERTIFICATE OF CORRECTION

| | | |
|---|---|---|
| PATENT NO. | : 11,498,848 B2 | Page 1 of 1 |
| APPLICATION NO. | : 16/604787 | |
| DATED | : November 15, 2022 | |
| INVENTOR(S) | : Gilles Méli et al. | |

It is certified that error appears in the above-identified patent and that said Letters Patent is hereby corrected as shown below:

On the Title Page

Item (73), after "Assignee: IMERYS MINERALS LIMITED", insert --(GB)--.

In the Claims

Claim 15, Column 20, Line 47, "bing" should read --being--.

Signed and Sealed this
Third Day of September, 2024

Katherine Kelly Vidal
*Director of the United States Patent and Trademark Office*